UNITED STATES PATENT OFFICE.

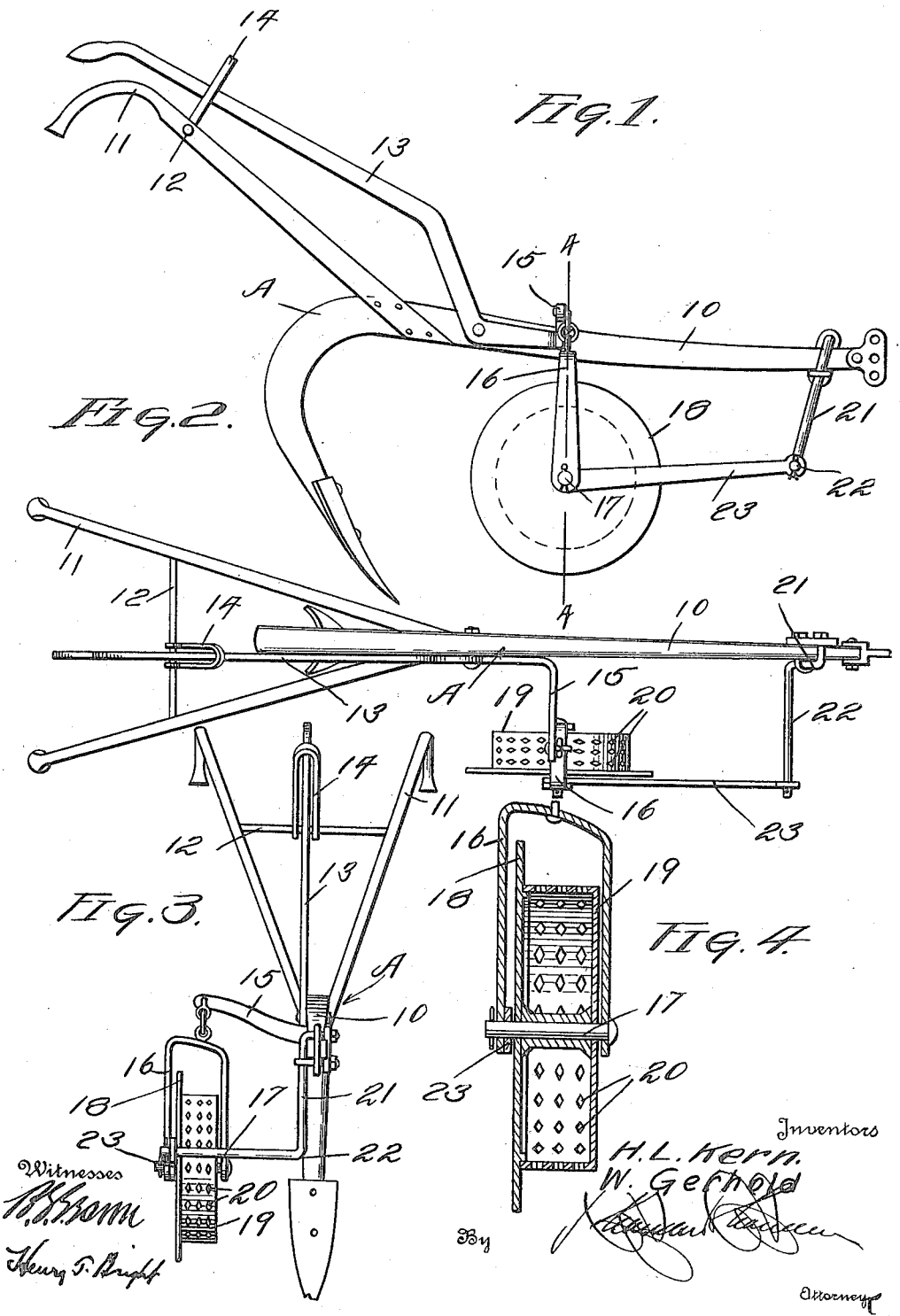

HARRY L. KERN AND WALTER GERHOLD, OF BEAUMONT, TEXAS.

PLANTER ATTACHMENT FOR PLOWS.

1,202,852.  Specification of Letters Patent.  Patented Oct. 31, 1916.

Application filed February 21, 1916. Serial No. 79,743.

*To all whom it may concern:*

Be it known that we, HARRY L. KERN and WALTER GERHOLD, citizens of the United States, residing at Beaumont, in the county of Jefferson, State of Texas, have invented certain new and useful Improvements in Planter Attachments for Plows; and we do hereby declare the following to be a full, clear, and exact description of the invention, such as will enable others skilled in the art to which it appertains to make and use the same.

This invention relates to planter attachments for plows.

The object of the invention is to provide a planter attachment which can be easily associated with an ordinary turning plow and when so associated will efficiently operate to drop the desired seed, the plow serving to cover the seed after they are dropped.

A further object of the invention is to provide an attachment of the type named which when applied to a plow can be easily controlled by the operator.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side view of a plow having the improved attachment associated therewith; Fig. 2, a plan view of what is shown in Fig. 1; Fig. 3, a front view of the plow, and Fig. 4, a section on the line 4—4 of Fig. 1.

Referring to the drawings A indicates generally a turning plow including the usual beam 10, handles 11 and brace bar 12 connecting the handles 11 adjacent their free ends.

Pivoted to the beam 10 is a controlling lever 13 which moves in a guide 14 mounted upon the bar 12. The forward end of this lever is provided with a lateral extension 15 from the free end of which is hung a U-shaped member 16 having rotatably mounted therein a hub 17. Fixed to the hub 17 is a disk or wheel 18 and formed integral with this disk is a cylindrical seed casing 19 of less diameter than the disk and having its periphery provided at spaced points with rows of seed discharge openings 20. Secured to the forward end of the beam 10 is a bracket 21 having a laterally extending portion 22 the free end of which has pivotally connected thereto one end of a connecting bar 23, the other end of said bar being pivotally connected to the hub 17. By this construction it will be obvious that when the lever 13 is free the disk 18 will descend under the influence of gravity and engage the ground so that both the disk 18 and the casing 19 will be rotated as the plow is moved along the ground. During this rotation of the casing 19 the seeds will be dropped at intervals through the discharge openings 20 and as the plow proper is in the rear of the casing 19 it will serve to cover the seeds dropped in advance thereof. The bar 23 will serve to hold the disk 18 and casing 19 against assuming an angular relation to the beam 10. If it is desired to stop the planting operation it is only necessary to press down the rear end of the lever 13 and raise the disk 18 from the ground.

What is claimed is:—

The combination with a plow including a beam, a lever pivoted on the beam, a lateral extension on the forward end of the lever, a U-shaped member hung from the free end of said extension, a hub rotatably mounted within the member, a disk fixed on said hub, a cylindrical seed casing fixed to the disk and of less diameter than the latter, the periphery of said casing being provided at spaced points with rows of seed discharge openings, a bracket secured to the plow beam adjacent its forward end, a lateral extension on said bracket, and a connecting rod pivotally secured to the free end of the last named lateral extension and to said hub.

In testimony whereof, we affix our signatures in the presence of two witnesses.

HARRY L. KERN.
WALTER GERHOLD.

Witnesses:
O. K. MCCLAIN,
CHARLES LEE SCHUBECK.

Copies of this patent may be obtained for five cents each, by addressing the "Commissioner of Patents, Washington, D. C."